United States Patent
Koistinen et al.

(10) Patent No.: US 7,539,615 B2
(45) Date of Patent: May 26, 2009

(54) AUDIO SIGNAL QUALITY ENHANCEMENT IN A DIGITAL NETWORK

(75) Inventors: Tommi Koistinen, Vantaa (FI); Olli Kirla, Helsinki (FI)

(73) Assignee: Nokia Siemens Networks Oy, Espoo (FI)

( * ) Notice: Subject to any disclaimer, the term of this patent is extended or adjusted under 35 U.S.C. 154(b) by 769 days.

(21) Appl. No.: 10/451,956

(22) PCT Filed: Dec. 29, 2000

(86) PCT No.: PCT/EP00/13320

§ 371 (c)(1),
(2), (4) Date: Oct. 27, 2003

(87) PCT Pub. No.: WO02/054744

PCT Pub. Date: Jul. 11, 2002

(65) Prior Publication Data

US 2004/0076271 A1    Apr. 22, 2004

(51) Int. Cl.
G10L 19/12 (2006.01)
G10L 19/14 (2006.01)
G10L 19/00 (2006.01)

(52) U.S. Cl. .................. 704/226; 704/219; 704/228

(58) Field of Classification Search .......... 704/225, 704/226, 219, 228
See application file for complete search history.

(56) References Cited

U.S. PATENT DOCUMENTS 4,490,839 A * 12/1984 Bunge .................. 704/238

5,115,469 A * 5/1992 Taniguchi et al. .......... 704/228

(Continued)

FOREIGN PATENT DOCUMENTS

EP    0 910 200 A1    4/1999

(Continued)

OTHER PUBLICATIONS

ETSI TS 101 504 v8.0.1 (Aug. 2000) "Digital Cellular Telecommunications System (Phase 2+); Inband Tandem Free Operation (TFO) of Speech Codecs; Service Description; Stage 3,"Technical Specification.

(Continued)

*Primary Examiner*—Talivaldis I Smits
*Assistant Examiner*—Eric Yen
(74) *Attorney, Agent, or Firm*—Squire, Sanders & Dempsey, LLP

(57) ABSTRACT

The invention relates to a network element (1) and a method for enhancing the quality of digitised analogue signals transmitted in parameterised coded form via a digital network. In order to enable an enhancement of the quality of the digitised analogue signals on network side, the network element comprises means (20, 21) for extracting signals from and insert signals into the network, first processing means (24) for processing the extracted parameters in the parameter domain with functions suitable to enhance the quality of the digitised analogue signals and second processing means (26) for processing the extracted parameters in the linear domain with functions suitable to enhance the quality of the digitised analogue signals. Moreover included analysing and selecting means (23, 27) determine the expected enhancement of quality in the different processing domains and cause a corresponding insertion of processed signals back into the network. The proposed method comprises corresponding steps.

45 Claims, 8 Drawing Sheets

U.S. PATENT DOCUMENTS

| | | | |
|---|---|---|---|
| 5,224,167 A * | 6/1993 | Taniguchi et al. | 704/219 |
| 5,706,394 A * | 1/1998 | Wynn | 704/219 |
| 5,736,943 A * | 4/1998 | Herre et al. | 341/50 |
| 5,835,486 A * | 11/1998 | Davis et al. | 370/287 |
| 5,917,835 A * | 6/1999 | Barrett et al. | 714/755 |
| 5,943,644 A * | 8/1999 | Yamane et al. | 704/207 |
| 6,011,846 A | 1/2000 | Rabipour et al. | |
| 6,052,665 A * | 4/2000 | Momii et al. | 704/270 |
| 6,058,362 A * | 5/2000 | Malvar | 704/230 |
| 6,119,083 A | 9/2000 | Hollier et al. | |
| 6,119,084 A * | 9/2000 | Roberts et al. | 704/246 |
| 6,349,197 B1 * | 2/2002 | Oestreich | 455/63.1 |
| 6,453,289 B1 * | 9/2002 | Ertem et al. | 704/225 |
| 6,526,376 B1 * | 2/2003 | Villette et al. | 704/207 |
| 6,611,798 B2 * | 8/2003 | Bruhn et al. | 704/219 |
| 6,678,267 B1 * | 1/2004 | Anandakumar et al. | 370/356 |
| 6,985,856 B2 * | 1/2006 | Wang et al. | 704/226 |
| 7,069,208 B2 * | 6/2006 | Wang | 704/211 |
| 7,158,572 B2 * | 1/2007 | Dunne et al. | 375/241 |
| 2004/0083110 A1 * | 4/2004 | Wang | 704/500 |
| 2006/0215683 A1 * | 9/2006 | Sukkar et al. | 370/437 |

FOREIGN PATENT DOCUMENTS

| | | |
|---|---|---|
| WO | WO 97/49196 | 12/1997 |
| WO | WO 99/60720 | 11/1999 |

OTHER PUBLICATIONS

International Telecommunication Union; ITU-T Telecommunication Standardization Sector of ITU; H.323 (Nov. 2000); Series H: Audiovisual and Multimedia Systems, "Infrastructure of Audiovisual Services—Systems and Terminal Equipment for Audiovisual Services," Packet-Based Multimedia Communications Systems (Formerly CCITT Recommendation).

\* cited by examiner

AUDIO SIGNAL QUALITY ENHANCEMENT IN A DIGITAL NETWORK

FIELD OF THE INVENTION

The invention relates to a network element and a method for enhancing the quality of digitised analogue signals transmitted in parameterised coded form via a digital network.

BACKGROUND OF THE INVENTION

Digital networks like packet based IP (Internet Protocol) networks or TDM (Time Division Multiplex) based networks are employed to transmit not only signals traffic but also digitised analogue signals, in particular audio signals like speech and video.

Before an digitised analogue signal can be transmitted by the digital network, an analogue-to-digital conversion of the signal has to be carried out. Further, the signal is usually compressed, e.g. with a ratio of 8:1 or 4:1, to allow a low bit rate access to the core network and for capacity savings within the core network itself.

When transferring voice between two IP terminals, for example, the speech is converted and compressed by an encoder in the source terminal to form parameterised coded digitised analogue signals and decompressed and reconverted by a decoder in the destination terminal and vice versa.

The quality of the speech presented to an enduser at the respective source terminal depends on a variety of factors.

A first group of factors is network related and comprises delay, lost packets etc. on the transmission route.

A second group of factors is terminal related and comprises the quality of the microphone, the loudspeakers, the A/D converter, the automatic level control, the echo canceller, the noise suppressor etc. A further terminal related factor is the surroundings of the terminal, like environmental noise. Beside the different quality of employed speech enhancement features or services, some of the terminals might even lack completely certain speech enhancement features or services which would be useful to increase the satisfaction of the enduser.

A third group of factors appears when several networks are involved in one transmission, e.g. when an IP terminal interworks with the PSTN (Public Switched Telephone Network) or a mobile access network. In such a case, additional degradations may result from echo from PSTN hybrids or from acoustic noise from mobile terminals etc. IP-PSTN gateways are utilised to enable the inter-working between the IP network and the PSTN or the mobile access network. These gateways may include features for enhancing the quality of the speech they transmit.

However, some gateways are lacking important speech enhancement features.

In digital networks, usually nothing is done to compensate for the terminal or the network transition specific factors on the network side.

For GSM (Global System for Mobile communication) networks, the ETSI (European Telecommunication Standards Institution) TFO (Tandem Free Operation) specifies how multiple encoding and decoding, especially at gateways and switches, can be avoided. When complying with the TFO model, a transmitted TFO stream includes parameterised coded speech that goes end-to-end in the speech parameter domain. The end-points may be two mobiles or a mobile and an IP-terminal via a gateway. Two IP terminals interconnected only by an IP network involve a TFO by nature. The same principles are valid for the GPRS (General Packet Radio Service) and the third generation networks where the speech may stay all the way in the packet based network. Exemplary routes of the latter are: MS-BS-RNC-SGSN-GGSN-IP terminal or MS-BS-PCU-SGSN-GGSN-IP terminal (MS: Mobile Station; BS: Base Station; RNC: Radio Network Controller; SGSN: Serving GPRS Support Node; GGSN: Gateway GPRS Support Node; PCU: Packet Control Unit). However, until end-to-end TFO connections are realised in all networks, the transition factors influencing the quality of transmitted digitised analogue signals still have to be considered and the terminal specific factors are not affected by the TFO approach anyhow.

In the whole, it would be beneficial if digital networks provided means for enhancing the quality of digitised analogue signals. Multiple encoding and decoding, however, should be avoided for quality reasons.

For packet based networks, ITU-T specification H.323 (07/2000) introduces a multipoint processor (MP) used for conference calls. The multipoint processor prepares N-audio outputs from M-audio inputs by switching and/or mixing. For mixing, the input audio signals are decoded to linear signals on which a linear combination is performed. The resulting signal is encoded again to the appropriate audio format. It is proposed that the multipoint processor moreover eliminates or attenuates some of the input signals in order to reduce noise and other unwanted signals.

This means, however, that an additional decoding and encoding step is introduced as well, which should be avoided for the sake of the quality of the audio signal as mentioned above and of a small processing delay.

SUMMARY OF THE INVENTION

It is an object of the invention to provide a network element and a method that allow for a satisfactory enhancement of the quality of digitised analogue signals transmitted via a digital network on the network side.

On the one hand, this object is reached by a network element for enhancing the quality of digitised analogue signals transmitted at least in parameterised coded form via a digital network to which the network element has access, comprising: a payload extraction block for extracting coded digitised analogue signals from the digital network, which coded digitised analogue signals include at least in part parameterised coded digitised analogue signals; first processing means for processing the extracted parameterised coded digitised analogue signals in the parameter domain with functions suitable to enhance the quality of the digitised analogue signals; second processing means for processing at least part of the extracted coded digitised analogue signals in the linear domain with functions suitable to enhance the quality of the digitised analogue signals; a payload insertion block for inserting processed coded digitised analogue signals to the digital network; and analysing and selecting means for determining the quality improvement of the digitised analogue signals resulting from a processing of the extracted coded digitised analogue signals in the parameter domain and from a processing of the extracted coded digitised analogue signals in the linear domain and for causing that at least coded digitised analogue signals processed by the processing means leading to the better improvement are inserted back to the digital network by the payload insertion block.

On the other hand, the object is reached by a method for enhancing the quality of digitised analogue signals transmitted at least in parameterised coded form via a digital network, comprising:

extracting coded digitised analogue signals from the digital network, which coded digitised analogue signals include at least in part parameterised coded digitised analogue signals;

determining the quality improvement of the digitised analogue signals to be expected by a processing of the extracted encoded digitised analogue signals in the parameter domain and by a processing of the extracted encoded digitised analogue signals in the linear domain;

processing the extracted parameterised coded digitised analogue signals in the parameter domain at least if a greater quality improvement is expected by processing in the parameter domain, with functions suitable for enhancing the quality of digitised analogue signals; and processing at least part of the extracted coded digitised analogue signals in the linear domain at least if a greater quality improvement is expected by processing in the linear domain, with functions suitable for enhancing the quality of digitised analogue signals; and inserting at least those processed coded digitised analogue signals to the digital network that were processed in the domain, the processing in which was expected to result in a greater quality improvement.

By including a possibility for processing transmitted coded digitised analogue signals not only in the linear domain but also in the parameter domain, the network element and the method according to the invention enable an optimal enhancement of the quality of digitised analogue signals on the network side.

The analysing and selecting means of the network of the invention determine, whether linear and/or parameter domain processing should be used by analysing whether linear or parameter domain processing results in a better quality improvement of the digitised analogue signals. A corresponding step is provided in the method of the invention. For example, if parameter domain processing is not technically feasible for the enhancement of the signal quality, linear processing is expected to result in a better quality enhancement. If the processing in the parameter domain is possible, the expected quality enhancement is determined for both kinds of processing and the selection is based on a comparison of the expected enhancements.

In case that a processing of extracted signals in the parameter domain is expected to lead to a better enhancement of the quality of the digitised analogue signal, at least signals processed in the parameter domain are inserted to the network again. In case that a processing of extracted signals in the linear domain is expected to lead to a better enhancement of the quality of the digitised analogue signal, only signals processed in the linear domain are inserted to the network again.

In the case that the processing in the parameter domain is expected to lead to better results, signals processed in the linear domain should only be inserted to the network in addition to signals processed in the parameter domain, if the processing in the linear domain leads to a larger processing delay because of necessary time consuming pre- and after-treatments. This way, it is possible to dispensed with the disadvantageous additional decoding and encoding of the extracted signals necessary before processing parameterised coded digitised analogue signals in the linear domain. No additional decoding and encoding of the signals means a better quality of the digitised analogue signals and at the same time less processing delay. For example, parameterised coded digitised analogue signals transmitted via packet based networks, as well as coded digitised analogue signals transmitted in the TFO stream in a TDM based network require decoding before and encoding after processing in the linear domain, while coded digitised analogue signals transmitted in the PCM stream in a TDM based network require only a-law or µ-law to linear conversions and vice versa for linear processing.

While the signals to be inserted to the network again are selected according to the expected quality improvement, a processing in both domains can be carried out in any case, if the processed signals are to be evaluated for determining which processing is expected to lead to a better result. In case that only signals processed in the parameter domain are to be inserted to the network again, this insertion can be carried out before the processing in the linear domain is completed. The signals processed in the linear domain are then used as soon as they are ready for determining the future expected quality improvements by linear processing.

Preferred embodiments of the invention become apparent from the subclaims.

The analysing and selecting means of the network of the invention can base its decision whether a processing in the parameter domain or in the linear domain is to be carried out on an analysis of incoming parameter domain data, like parameters for gains. Alternatively or additionally, it can base the decision on measurements, like voice level, signal-to-noise ration and presence of echo, carried out in the linear domain after decoding. Preferably, the measurements and the selection are made before and after the input data is processed in the linear and in the parameter domain. The selection of the processing domain can then be made by comparing the measurements to fixed thresholds that suggest either the linear or parameter domain processing. The numerical values for the thresholds can be derived by performing e.g. real listening tests with varying test input data that is processed and assessed in both domains.

As several factors affect the choice of the processing domain, it may be difficult to formulate threshold patterns that result in the best choices in all call conditions. Therefore, in a further preferred embodiment, a neural network based approach is used for selecting the processing domain that is expected to bring the better results. Incoming parameter domain data and results from measurements after decoding can be used as the input for the neural network of N neurons. Weights or coefficients for the neurons can be derived by training the network with appropriate test data and outputs from real listening tests.

The processing means for processing in the parameter domain and the processing means for processing in the linear domain may include a variety of functions. Echo cancellation, noise reduction and level control are possible functions for both, processing in the parameter and in the linear domain. In addition, transcoding and speech mixing as conference bridge are at least possible functions for processing in the parameter domain.

For example, for a gain control in the parameter domain, the gain parameters of the extracted parameterised coded digitised analogue signals can be compared with a desired gain for forming corresponding new gain parameters. The desired gain parameters can be pre-set, input by the user or calculated out of the received gain parameters. The new gain parameters are then inserted into the extracted parameterised coded digitised analogue signals, thus substituting the original gain parameters.

In order to achieve a noise suppression by processing in the parameter domain, a processing in the time domain or in the frequency domain, preferably in both, is carried out. In the time domain, noise portions and low level signal portions of the extracted parameterised coded digitised analogue signals are attenuated and corresponding gain parameters are inserted in the extracted parameterised coded digitised analogue signals, thus replacing the original gain parameters. In the frequency domain, frequency portions of noise in the extracted parameterised coded digitised analogue signals which have approximately the same energy as the noise estimate are attenuated. Corresponding linear prediction parameters are then inserted to the extracted parameterised coded digitised analogue signals, thus replacing the original linear prediction parameters.

For echo suppression in the parameter domain, parameterised coded digitised analogue signals are extracted from both transmission directions. The signals can then be compared in order to detect echoes in the first parameterised coded digitised analogue signals. Portions of the first parameterised coded digitised analogue signal are replaced by comfort noise portions, if an echo was determined in the portion of the first parameterised coded digitised analogue signal. The echo signal can also first be attenuated and then, the residual echo signal is suppressed. It is proposed to include a possibility for by-passing the first parameterised coded digitised analogue signals without echo compensation, if there is no signal activity in the opposite direction or if the signal level of the extracted parameterised coded digitised analogue signals is below a threshold level in the opposite direction.

In a preferred embodiment of the invention, a bad frame handler block is included in the network element. This block may work together with the payload extraction block and the processing means for detecting missing frames, e.g. from RTP (Real Time Protocol) numbers, for regenerating missing blocks, e.g. by using interpolation techniques or copying previous frames, and for reordering frames in disorder within a buffering window. A suitable location for the bad frame handler block is immediately after the payload extraction block.

In a further preferred embodiment of the invention, the network element comprises analysing means for determining whether any processing is to be applied to the extracted parameterised coded digitised analogue signals and for selecting the functions that are to be applied to extracted coded digitised analogue signals in the parameter domain and/or the linear domain. Those functions can be included in the analysing and selecting means used for determining the quality improvement expected by a processing in the parameter domain and by a processing in the linear domain.

In case no processing is deemed to be necessary, the coded digitised analogue signals can simply pass one or both of the processing means without any processing being carried out.

The choice can be taken by the analysing means autonomously by analysing the received coded digitised analogue signals and possibly by analysing already processed signals. Alternatively or additionally, the choice may depend on an external control signal. Even if an external control signal is employed and does not ask for any processing to be carried out, the analysing means can evaluate the quality of the received parameterised coded digitised analogue signals, e.g. with regard to speech level, existence of echo, signal-to-noise ratio, and select one or several processing functions. The external control signal can enter the network element via a control block in the network element, which may be conform to the specified H.248 protocol, and indicates for example that there is already an echo canceller on the connection and that therefore the received parameterised coded digitised analogue signals can be forwarded without echo cancellation by the processing means. The control block can also have a direct access to the processing means for selecting the processing functions that are to be carried out by itself.

Selection of the most suitable functions to be employed is also a preferred feature of the method according to the invention.

The digital network involved may be either packet based, like IP-, UDP- (User Datagram Protocol) or RTP- (Real Time Protocol) networks, or TDM based. Still, any other digital network transmitting parameterised coded digitised analogue signals can be accessed as well. When referring in this specification to an IP network, this includes any IP-, UDP- or RTP-network.

In a packet based network, the digitised analogue signals are only transmitted as parameterised coded digitised analogue signals. In a TDM based networks, employed e.g. for GSM, the digitised analogue signals can be transmitted as parameterised coded digitised analogue signals in a TFO stream and simultaneously in a PCM (Pulse Code Modulation) stream as a-law or μ-law coded G.711 PCM samples.

Accordingly, in one preferred alternative, the payload extraction block is suitable to extract parameterised encoded digitised analogue signals from an IP stack of a packet-based network and the payload insertion block is suitable to insert parameterised encoded digitised analogue signals to said IP stack of the packet-based network.

In another preferred alternative, the payload extraction block is suitable to extract a TFO stream and, if desired, in addition a PCM stream from the timeslots of a TDM based network. In the latter case, the two streams are separated in the payload extraction box for further processing, and the payload insertion block is suitable to combine a supplied TFO stream with a supplied PCM stream again and to insert the combined stream to said TDM based network. If the payload insertion means is only provided with a PCM stream, however, it can also insert only this PCM stream back to said TDM based network again.

In GSM-PCM, the payload extraction block can take only the TFO stream as input or alternatively the TFO stream and the PCM stream, which are then separated in the payload extraction block.

An extracted TFO stream that is inserted to the digital network again has either been processed in the parameter domain or in the linear domain with a decoding before and an encoding after the linear processing. Which kind of TFO stream is inserted should depend on the achieved or achievable quality improvement of the included digitised analogue signal. In addition, the TFO stream processed after decoding in the linear domain should be transformed without prior encoding into a PCM stream that is combined with the selected encoded TFO streams for insertion into the digital network. However, in case no TFO stream is available at the payload extraction means or in case the TFO stream is stopped, the PCM stream can be extracted and processed in the linear domain and output to the digital network via the payload insertion means by itself.

Alternatively, the TFO stream can be processed in the parameter domain and the PCM stream, which does not have to be decoded for linear processing, can be processed in parallel in the linear domain. In case the TFO stream is only processed if it is expected to lead to a better result than the processing of the PCM stream, the TFO stream is not necessarily included in the data inserted to the network again when not processed.

The network element according to the invention can be located freely beside or inside any other network element. In a packet based network, the network element of the invention is preferably co-located with a broadband IP node, which leads to minimal processing delays.

The network element and the method of the invention can be used for the enhancement of the quality of any digitised analogue signals transmitted by a digital network in parameterised coded form. It is of particular relevance for transmitted speech, but also e.g. for video.

BRIEF DESCRIPTION OF THE FIGURES

In the following, the invention is explained in more detail with reference to drawings, of which

DETAILED DESCRIPTION OF THE INVENTION

Figure 1:
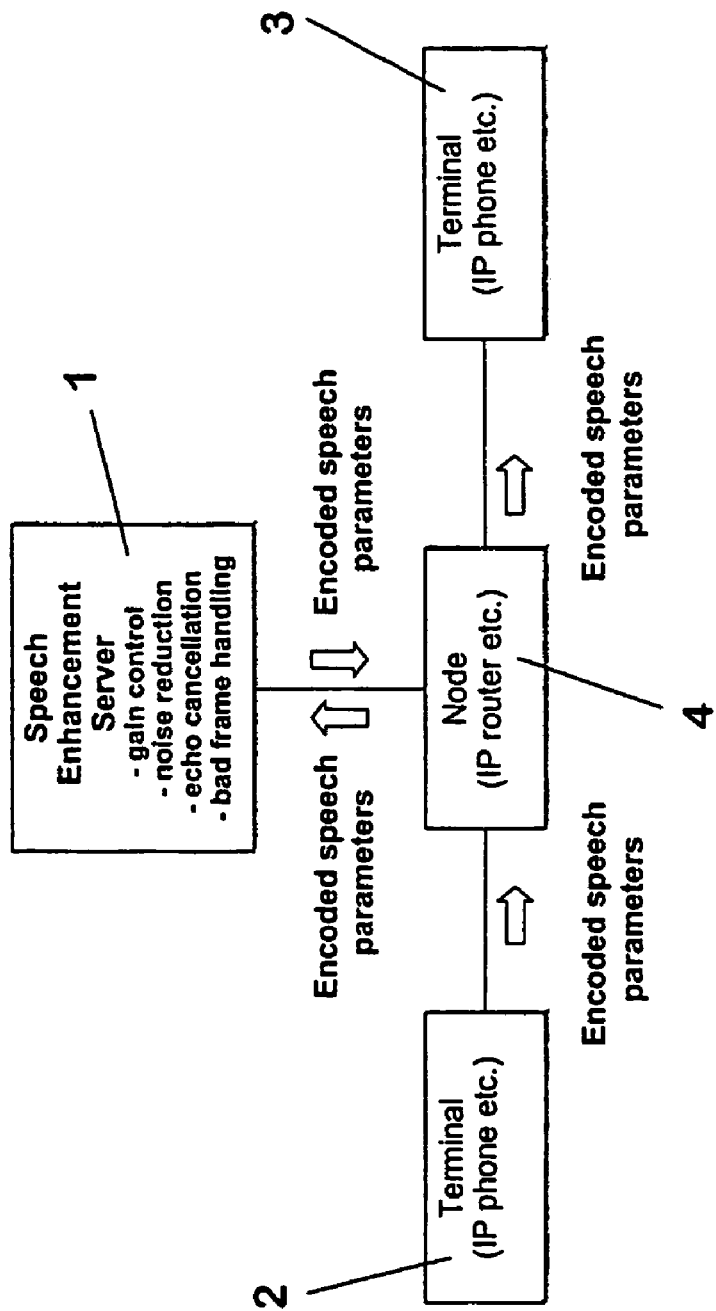
FIG. 1 shows the integration of the network element according to the invention in an IP-network.

FIG. 1 shows the environment of a network element 1 according to the invention.

A fist terminal 2 is connected via an IP network with a second terminal 3. Both terminals 2, 3 can be IP phones. At some place in the IP network, there is an IP router forming a broadband IP node 4. Co-located with and connected to this network node 4, there is a network element 1 according to the invention.

Network element 1 operates in the speech parameter domain and is able to perform signal processing functions for parameterised coded speech. The available functions are echo cancellation, noise reduction, gain control, conference bridge and bad frame handling. Possibilities for realising some of those functions will be described later with reference to FIGS. 5 to 8.

Parameterised coded speech passes from the first terminal 2 to the network node 4. They are forwarded from the network node 4 to the network element 1, which carries out the appropriate functions in the speech parameter domain. Then, the processed parameterised coded speech is sent back to the network node 4 which forwards them to their destination, the second terminal 3.

Figure 2:
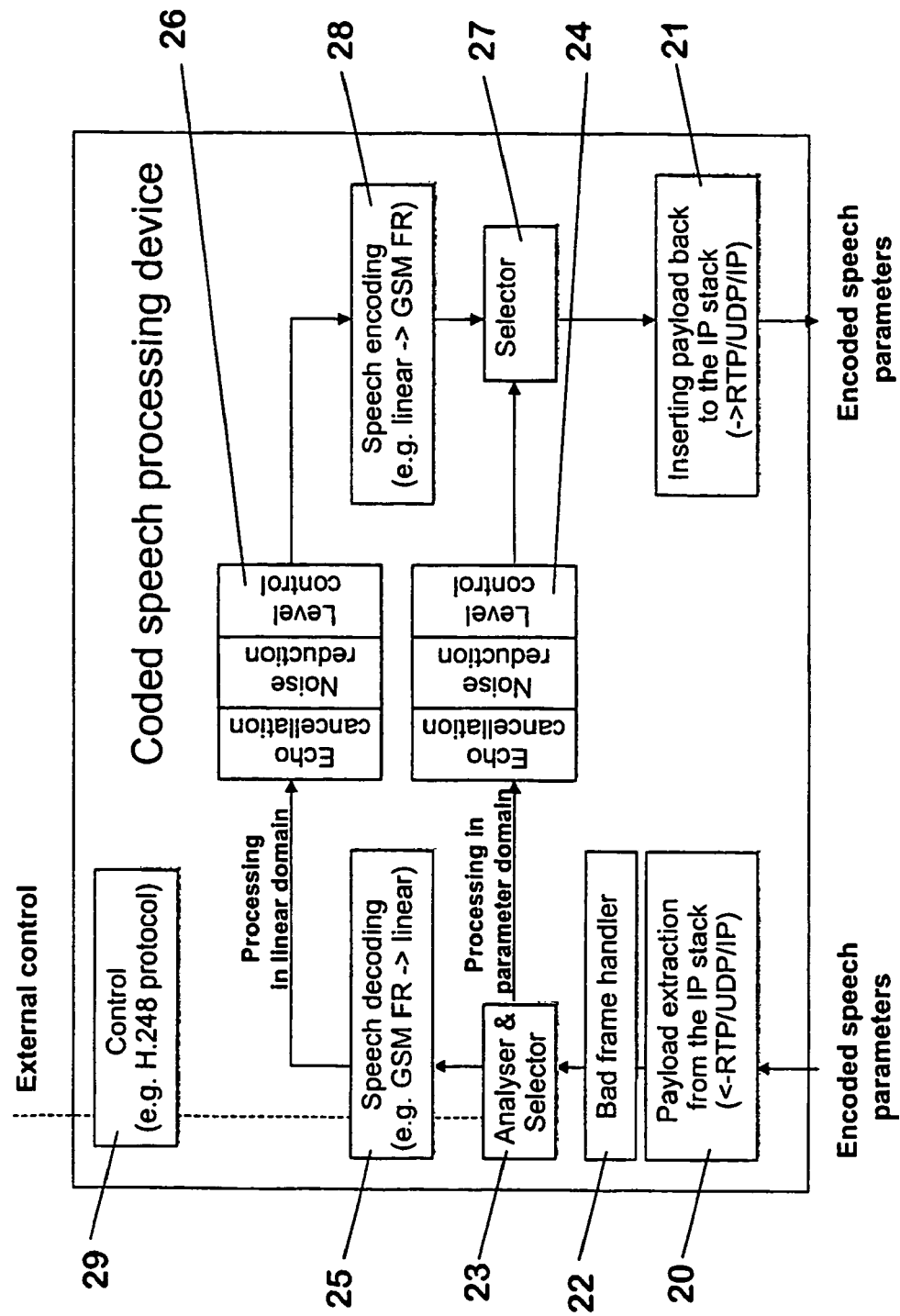
FIG. 2 shows a first embodiment of the network element according to the invention.

FIG. 2 shows the different elements comprised in an embodiment of the network element 1 of FIG. 1.

A payload extraction block 20 and a payload insertion block 21 form together the interface of the network element 1 to the network node 4. Within the network element 1, the payload extraction block 20 is connected via a bad frame handler block 22 to an analyser and selector block 23. The two outputs of the analyser and selector block 23 are connected on the one hand to first processing means 24 and on the other hand via a speech decoding block 25 to second processing means 26. Each of the processing means 24, 26 comprises a function for echo cancellation, for noise reduction and for level control. The output of the first processing means 24 is connected to the input of a selector 27. The output of the second processing means 26 is equally connected to the input of the selector 27, but via a speech encoding block 28. The output of the selector 27 is input to the payload insertion block 21. Finally, there is a control block 29, e.g. an H.248 protocol control block, which receives as input a control signal generated externally of the network element 1 and the output of which is connected to the analyser and selector block 23.

The network element 1 functions as follows:

The payload extraction block 20 extracts the payload, i.e. parameterised coded speech, from the IP stack of the network node 4 of FIG. 1. The speech parameters are checked by the bad frame handler block 22. Here, missing frames are detected and regenerated by using interpolation techniques. Moreover, frames in disorder are reordered within a buffering window. The processed signals are then forwarded to the analyser and selector block 23.

The analyser and selector block 23 analyses the speech parameters and determines whether a processing in the linear domain or in the parameter domain would lead to a better result and which of the available functions should be applied. If parameter domain processing is not technically feasible for the speech enhancement, linear processing is selected. The analyser and selector block 23 can also determine that no processing at all needs to be carried out. The analyser and selector block 23 receives in addition external information via the control block 29, indicating for example whether there is already an echo canceller on the connection so that a further echo cancellation is not necessary.

If no processing or a processing in the parameter domain was selected, the analyser and selector block 23 outputs the encoded speech to the first processing means 24, which applies all selected functions to the parameterised coded speech in the parameter domain.

If a processing in the linear domain was supposed to be necessary, the analyser and selector block 23 outputs the parameterised coded speech to the speech decoding block 25. The speech decoding block 25 decodes the coded speech, which may be suitable for GSM FR (Full Rate), to form a linear signal. The linear speech signal is then input to the second processing means 26, which applies all selected functions to the linear speech signal in the linear domain. After processing, the linear speech signal is input to the speech encoding block 28, which encodes the linear speech signal to form parameterised coded speech suitable for GSM FR again.

The selector 27 receives the output signals of the speech encoding block 28 and of the first processing means 24 and is moreover controlled by the analyser and selector block 23. Therefore, the selector 27 is able to determine, whether the signals from the first processing means 24 or the signals from the speech encoding block 28 constitute processed coded speech and to forward the respective signals to the payload insertion block 21. The selector 27 can moreover support the work of the analyser and selector block 23 by providing information about processed signals.

In the payload insertion block, the parameterised coded speech is inserted back as payload to the IP stack of the network node 4, from where it is forwarded to its destination 3.

In the whole, an enhancement of the quality of speech can be achieved, while additional decoding and encoding is only carried out if necessary. A superfluous decrease in the speech quality is therefore avoided and the processing delay is kept low by the processing in the parameter domain. Since the network element 1 is co-located with the broadband IP node 4, processing delays are further minimised.

Figure 3:
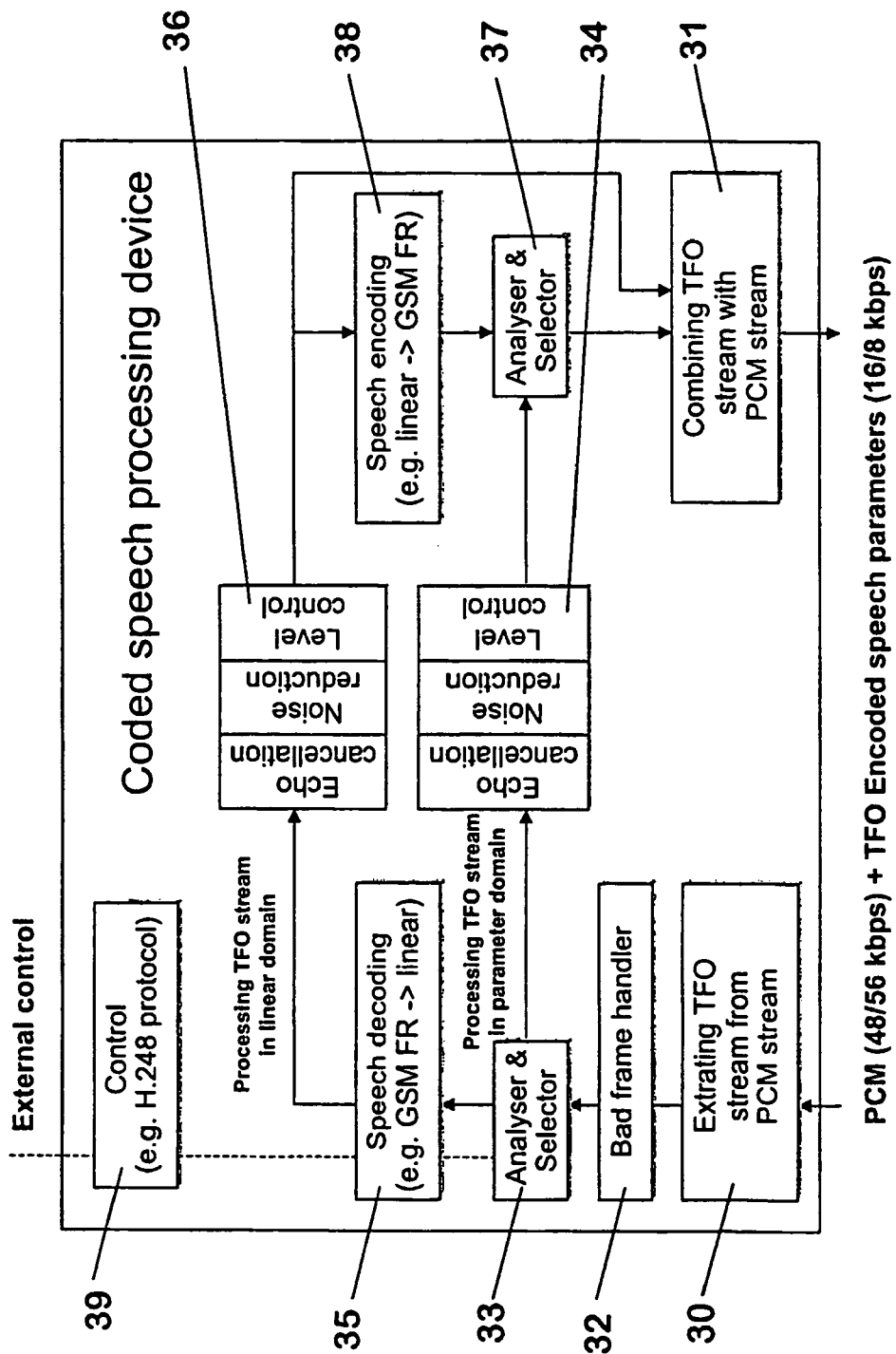
FIG. 3 shows a second embodiment of the network element according to the invention.

FIG. 3 schematically illustrates another embodiment of the network element of the invention. The embodiment is similar to the first embodiment of the network element, but it is employed for processing of encoded speed parameters received from a network node in a TDM based network, which is used for GSM TFO.

Equal to the network element of FIG. 2, the network element of FIG. 3 comprises a payload extraction block 30, a bad frame handler 32, an analyser and selector block 33, a decoding block 35, first and second processing means 34, 36, an encoding block 38, a payload insertion block 31 and a H.248 control block 39. Both processing means 34, 36 comprise again functions for echo cancellation, noise reduction and level control. The elements are connected to each other in the same way as in FIG. 2. In contrast to the network element of FIG. 2, however, instead of a selector block 27, a second analyser and selector block 37 is integrated between the encoding block 38 and the payload insertion block 31. Moreover, the output of the second processing means 36 is not only connected to the encoding block 38, but also directly to the payload insertion block 31.

The network element of the second embodiment functions as follows:

The signal entering the payload extraction block 30 from a network node contains a G.711 PCM stream of 48 or 56 kbps in the most significant bits and GSM TFO encoded speech parameters at 16 or 8 kbps in the least significant bits. In the payload extracting block 30, the TFO stream is separated from the PCM stream. Only the TFO stream is forwarded to the bad frame handler block 32, where it is treated as described for the treatment of the parameterised coded speech in the embodiment of FIG. 2.

After the bad frame handling, the TFO stream is inputted to the analyser and selector block 33. The analyser and selector block 33 forwards the TFO stream on the one hand to the first processing means 34, where the stream is processed in the parameter domain. On the other hand, the analyser and selector block 33 forwards the TFO stream to the decoding means 35, where a speech decoding, e.g. again a GMS FR to linear decoding, is carried out. The decoded TFO stream is then inputted to the second processing means 36, where it is processed in the linear domain. For both processing means 34, 36, the functions to be applied are chosen in the first analyser and selector means 33 according to an external control signal entering the network element via the control block 39.

The output of the first processing means 34 fed to the analyser and selector block 37. The output of the second processing means 36 is speech encoded again in the encoding means, e.g. linear to GSM FR encoding, and fed to the second analyser and selector block 37 as well.

The first analyser and selector block 33 and the second analyser and selector block 37 work together for determining which processing, the one in the parameter domain or the one in the linear domain, results in a better voice quality.

In case that parameter processing of the TFO stream is determined to result in a better voice quality than linear processing of the decoded TFO stream, only the TFO stream coming from the first processing means 34 is forwarded by the second analyser and selector block 37 to the payload inserting means 31. In case that linear processing of the decoded TFO stream is determined to result in a better voice quality than parameter processing of the TFO stream, only the TFO stream coming from encoding block 38 is forwarded by the second analyser and selector block 37 to the payload inserting means 31.

Both paths can be working all the time so that a change between the different modes, pure linear processing and parallel processing, can be carried out without discontinuities in the internal states of the decoding means 25 and the encoding means 28.

The output of the second processing means 36 is forwarded in addition without any encoding directly to the payload insertion means 31. In the payload insertion means 31, a PCM stream is formed out of the decoded and linearly processed TFO stream. The PCM stream and the selected coded TFO stream are then combined and inserted back into the TDM based network for further transmission.

Thus, the speech quality of the digitised analogue signal in the output PCM stream is improved by linear processing and the speech quality of the digitised analogue signal in the output TFO stream is improved by processing in the parameter domain or in the linear domain, depending on which processing leads to a better result.

If there is no TFO stream available in the signal extracted by the payload extracting means 30, or if the TFO stream is stopped, a possibility is provided for conducting the PCM stream through the bad frame handler 32 for frame related treatment and through the second processing means 36 for processing in the linear domain. The passing of a decoding block is not necessary, since the PCM stream does not contain parameterised data. It should be noted, though, that linear processing of a G.711 PCM stream requires a-law or µ-law to linear conversions and vice versa. The processed PCM stream is then inserted to the digital network again by the payload insertion means 31.

Figure 4:
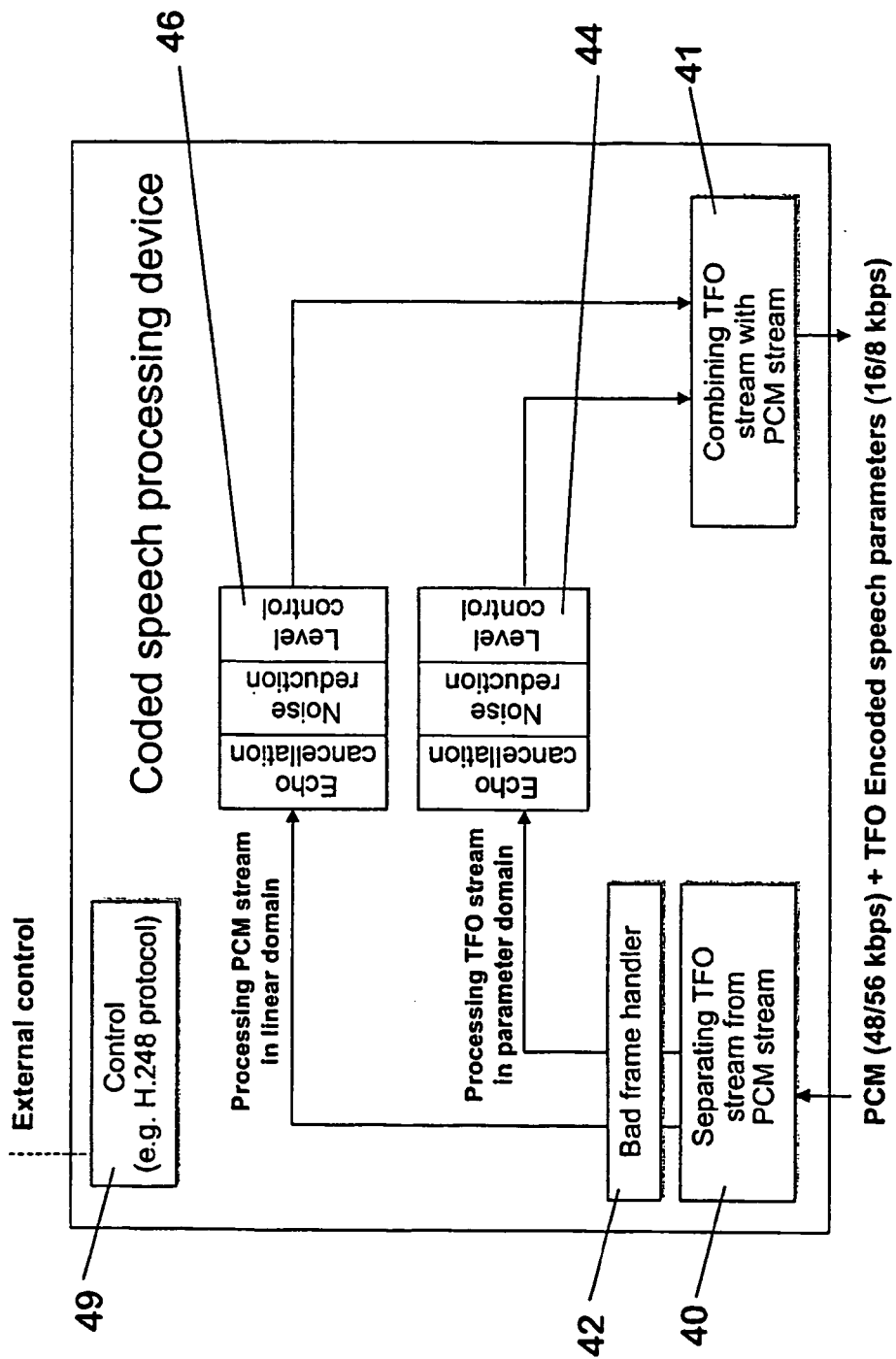
FIG. 4 shows a third embodiment of the network element according to the invention.

FIG. 4 schematically illustrates a third embodiment of the network element of the invention constituting a second option for enhancing the quality of speech in a TDM based network used for GSM TFO.

In this example, a payload extracting block 40 is connected via a bad frame handler block 42 directly to first and second processing means 44, 46. Both processing means 44, 46 comprise again functions for echo cancellation, noise reduction and level control. Also the outputs of the first and the second processing means 44, 46 are connected only directly to inputs of the payload insertion block 41. A H.248 protocol control block 49 is present again.

The network element of the third embodiment functions as follows:

The PCM stream and the TFO stream entering the payload extraction block 40 from a network node are separated by the payload extraction block 40 as in the embodiment of FIG. 3. In this embodiment, however, both, the TFO stream an the PCM stream, are forwarded to the bad frame handler block 42 and treated there as explained with reference to FIGS. 2.

After the bad frame handling, the TFO stream is forwarded to the first processing means 44, where it is processed in the parameter domain. At the same time, the PCM samples are forwarded to the second processing means 46. Since in this embodiment, only the PCM samples are processed by the processing means 46 working in the linear domain, a decoding block is not necessary; as mentioned with regard to the embodiment of FIG. 3 the PCM stream does not contain parameterised data. In both processing means 44, 46, the functions to be applied are chosen according to an external control signal by means of the control block 49 of the network element.

Thus, speech enhancement is carried out for both, the TFO stream and the PCM stream separately at the same time. In any case, the coded speech in the TFO stream is not decoded for processing and encoded again.

The TFO stream and the PCM stream leaving the processing means 44, 46 are combined in the payload insertion block 41 and inserted back into the TDM based network for further transmission. It can be decided at some other place of the network which one of the streams should be used for obtaining the best voice quality.

Each of the three described embodiments of the network element according to the invention allows for an enhancement of the quality of parameterised speech or video on the network side with minimal processing delay. They can be located freely beside or inside any existing network element.

Now, different possibilities of processing in the parameter domain in the first processing means 24, 34, 44 of one of FIGS. 2 to 4 will be described with reference to FIGS. 5 to 8.

Figure 5:
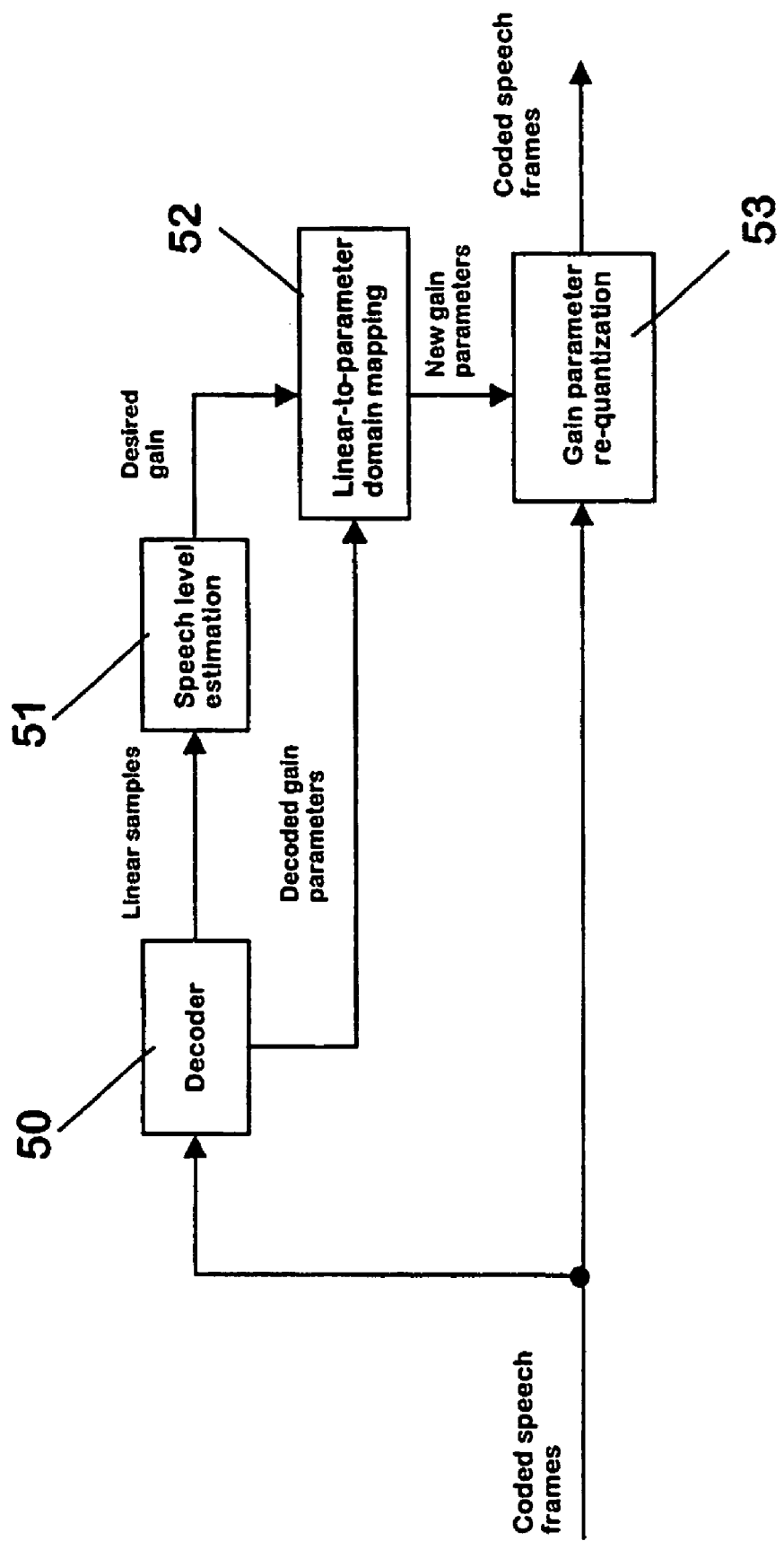
FIG. 5 shows a block diagram of an embodiment of a parameter domain gain control.

FIG. 5 shows a block diagram of a gain control device that can be integrated in a first processing means of a network element according to the invention for gain control in the parameter domain. An input line is connected on the one hand to the input of a decoder 50 and on the other hand to a first input of a gain parameter re-quantisation block 53. The decoder 50 is further connected directly and via a speech level estimation block 51 to a linear-to-parameter domain mapping block 52. The output of the linear-to-parameter domain mapping block 52 is connected to a second input of the gain parameter re-quantisation block 53 which is connected in addition to an output line.

Incoming coded speech frames are forwarded to the decoder 50, where the coded speech is linearised before being fed to the speech level estimation block 51. The speech level estimation block 51 comprises an internal voice activity detector (VAD) used for indicating whether the level estimate has to be updated, since it is desirable that in the speech level estimate only the speech level is estimated.

In the speech level estimation block 51, a desired gain value is calculated based on an estimated speech level and a predetermined desired target speech level. The desired gain is fed to the first input for the linear-to-parameter domain mapping block 52.

The speech estimation block 51 is only needed for an automatic level control. In case a fixed gain control is to be used, possibly with a user settable gain, the decoder 50 and the speech estimation block 51 can be omitted.

Further fed to the linear-to-parameter domain mapping block 52 are decoded gain parameters of current speech frames of e.g. 20 ms or of sub-frames of e.g. 5 ms, which decoded gain parameters are coming directly from the decoder 50. The decoded gain parameters are typically excitation gain parameters of a code excited linear prediction (CELP) speech coder. These gain parameters typically consist of adaptive and fixed codebook gains, which are vector quantised for the transmission. Scalar values of these parameters can be obtained from internal intermediate values of the decoder 50.

In the linear-to-parameter domain mapping block 52, the linear desired gain value is converted to appropriate new gain parameters of a speech coder. A codebook based mapping is used for determining these new gain parameters for the current frame or sub-frame in order to achieve the desired gain. The codebook is a three-dimensional table in which adaptive codebook gain, fixed codebook gain and linear gain values form each dimension. The new gain parameter values are read from the table as soon as all input values for the frame or sub-frame are known. This table is trained beforehand in a way that the errors between the new gain parameter values and the gain parameter values of gain scaled coded frames for each desired linear gain value are minimised. Alternatively, the mapping table could be trained by minimising the error between the decoded re-quantised speech frame and a decoded gain scaled speech frame. The training requires several test sequences in order fully train all elements within the mapping table.

In practical implementations it might be useful to compress the size of the table either by utilising redundancy in the data, by limiting linear gain values or by increasing the step size of input values. Another choice is to find out a mathematical function, which approximates the mapping function in such way that the performance is subjectively acceptable.

Finally, the new gain values are re-quantized for the transmission and the original gain values are replaced with the new values in the gain parameter re-quantization block 53.

Figure 6:
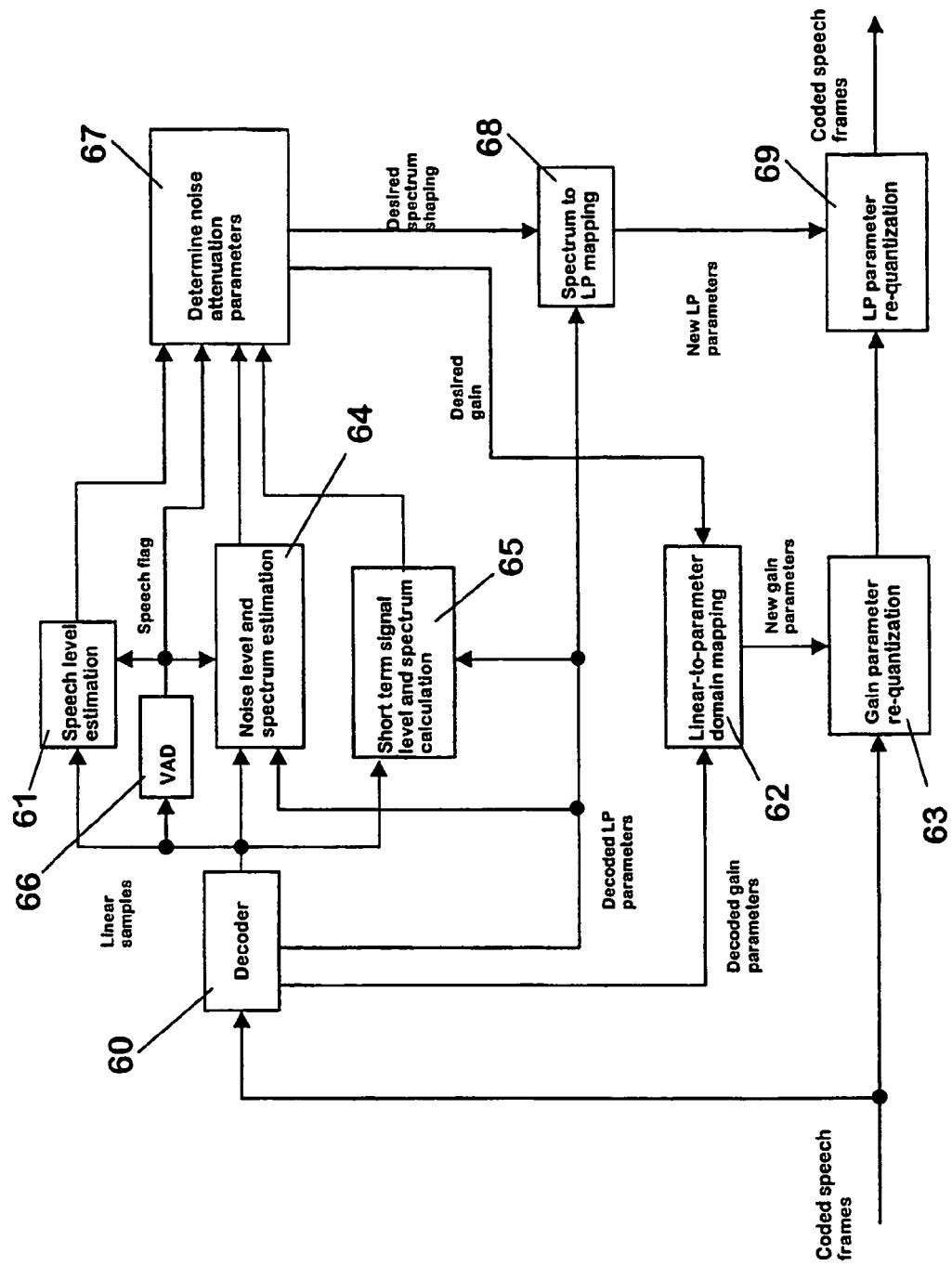
FIG. 6 shows a block diagram of an embodiment of a parameter domain noise suppression.

FIG. 6 shows a block diagram of a noise suppression device that may be integrated in a first processing means of a network element according to the invention for noise suppression in the parameter domain.

An input line is again connected on the one hand to the input of a decoder 60 and on the other hand to a first input of a gain parameter re-quantisation block 63. A first output of the decoder 60 is connected via a speech level estimation block 61, a VAD 66, a noise level and spectrum estimation block 64 and a short term signal level and spectrum calculation block 65 to a block 67 for determining noise attenuation parameters. The output of the VAD 66 is moreover connected to an input of the speech level estimation block 61 as well as to an input of the noise level and spectrum estimation block 64.

A first output of the block 67 for determining noise attenuation parameters is connected to a first input of a spectrum-to-LP (linear prediction) mapping block 68 and a second output to a first input of a linear-to-parameter domain mapping block 62.

A second output of the decoder 60 is connected to a further input of the noise level and spectrum estimation block 64 and of the short term signal level and spectrum calculation block 65 and additionally to a second input of the spectrum to LP mapping block 68. A third output of the decoder 60 is connected to a second input of the linear-to-parameter domain mapping block 62.

The output of the linear-to-parameter domain mapping block 62 is connected to a second input of the gain parameter re-quantisation block 63, the output of which is in turn connected to a first input of a LP parameter re-quantisation block 69. The second input of this block 69 is connected to the output of the spectrum-to-LP mapping block 68.

Finally, the output of the LP parameter re-quantisation block 69 is connected to an output line.

The decoder 60, the speech level estimation block 61, the linear-to-parameter domain gain mapping block 62 and the gain parameter re-quantisation block 63 can be identical or quite similar to the corresponding blocks 50-53 of the example of FIG. 5.

In the example of FIG. 6, noise suppression can be achieved by time-domain or frequency-domain parameter processing. Obviously by combining both methods, the optimum performance can be obtained.

The time-domain processing is based on a dynamic processing in which noise portions and very low level speech portions are slightly attenuated by a gain control function making use of the blocks 60-63 corresponding to the blocks 50-53 of FIG. 5. The gain control is therefore carried out as explained above, only that block 67 is used for forwarding the speech level estimate received by block 61 to the linear-to-parameter domain mapping block 62. This can be understood as an expanding function in parameter domain.

In the frequency-domain noise suppression, the frequency portions, which have more energy than speech, are attenuated. Traditionally, a linear time-domain signal is first converted to the frequency-domain by utilising Fourier Transform or filter banks. Then, a spectral subtraction can be applied to the frequency-domain signal. The amount of subtraction is based on a noise estimate, signal-to-noise ratio and possible other parameters. Finally, the noise attenuated signal is converted back to the time-domain. In this example, however, the frequency-domain processing is carried out by reshaping a Linear Prediction (LP) spectrum envelope of speech frames. This is explained more in detail in the following.

To achieve a high quality noise suppression, an accurate noise estimate has to be modelled. In order to differentiate between speech and speech pauses, a voice activity detector 66 is employed, which outputs a speech flag "true", when speech was detected and a speech flag "false" when a speech pause is detected. The voice activity detector 66 needs to be of high quality in order to get accurate VAD decisions even in low signal-to-noise ratio conditions, otherwise speech and noise estimates will diverge. Basically, the speech level estimate is updated in the speech level estimation block 61 when the speech flag is true, and noise level and spectrum estimates are updated in the noise level and spectrum estimation block 64 when the speech flag is false.

In block 64, the long term noise level and spectrum are estimated. For the long term noise spectrum estimate, Linear Prediction Coefficients (LPC) need to be decoded in the decoder 60 from the received speech frame. The LP coefficients are often converted to Line Spectral Pairs (LSP) by the encoder employed for encoding. In that case, the LPC values can be obtained from internal intermediate values of the decoder 60. As the LP coefficients define only the spectral envelope, the noise level estimate is required to scale the LP spectral envelope, in order to form a power spectrum estimate of the noise. Alternatively, the LP spectral envelope could be scaled by using excitation gain parameters of the received frame. As already mentioned above, the noise estimate is updated only if the VAD flag is false.

A short-term signal level and spectrum is calculated for the received frame in the same manner as previously described in the short term signal level and spectrum calculation block 65, except that no averaging or a fast averaging of previous frames is used for the level calculation. Typically, VAD decisions are not utilised.

The main intelligence of the algorithm lies in the block 67 for determining noise attenuation parameters. In this block 67, frequency-domain noise attenuation parameters (i.e. desired spectrum shaping) are selected according to the long term noise spectrum estimate received by block 64 and the received short term signal spectrum received by block 65. Accordingly, the desired time-domain gain is based on the long term speech and noise, and short term signal levels. Moreover, VAD information received by the VAD 66 and long term signal-to-noise ratio calculated from speech and noise level estimates received from blocks 61 and 64 are utilised as extra information for the algorithm of the block 67 for determining noise attenuation parameters.

In the spectrum shaping in block 67, the long term noise spectrum estimate is compared with the short term signal spectrum. A target frame spectrum is shaped in such a way that those short term spectrum parts, which are quite close to long term spectrum, are slightly attenuated. On the other hand those parts, which are clearly above of long term spectrum, are left untouched because those parts likely contain speech information. Additionally, the frequency and temporal masking of human auditory system can be utilised in frequency shaping. This means that if some parts of the spectrum lie within an auditory frequency masking curve, no frequency shaping is required for those parts. In temporal masking no frequency shaping (or time-domain processing) is needed for the current frame if one or more previous frames has contained higher speech level which introduce temporal masking effect for lower level signals of the current frame. Using these rules results in less distortion to processed speech as less shaping is done.

Furthermore, the spectrum shaping can be controlled by the VAD flag in such way that less shaping is applied if a speech pause was detected. The noise attenuation is then mainly achieved by gain processing during speech pauses by blocks 60-63. In addition, also the short term signal level can control the amount of shaping. Namely, there is less shaping with low level frames as the noise attenuation is partly handled with gain processing. Finally, the amount of spectrum shaping can depend on the long term signal-to-noise ratio (SNR) in such way that less shaping is applied in high SNR in order to preserve high quality in noiseless speech conditions.

As soon as the desired spectrum shaping is calculated for the current frame, original LP coefficients have to be converted according to the desired spectrum. This is carried out in the spectrum-to-LP mapping block 68. The mapping can be realised again as codebook mapping by using the original LPC and the desired spectrum as input parameters. Alternatively, new LP coefficients could directly be calculated from the desired spectrum by converting the spectrum to an LP spectrum envelope and thereby converting it to LP coefficients.

Finally, in the LP parameter re-quantisation block 69, the new LPC parameters are quantised or converted to LSP parameters and the old parameters are replaced with new ones in the coded frames.

As mentioned previously, a signal dynamics expanding function can be used together with the spectrum shaping or it can be even used alone. If it used alone, only a slight expansion is allowed as it might cause a noise modulation effect. Basically in expansion, the lower the signal level is, the more attenuation is applied. The expansion threshold is controlled by the noise level estimate in such a way that the frame or sub-frame exceeding the noise level estimate is not attenuated. Furthermore, the VAD 66 can control the expansion in such a way that slightly less expansion is utilised whenever the current frame is a speech frame. Thereby the attenuation of low level speech phonemes can be minimised.

As soon as the desired linear gain for the current frame or sub-frame is found, the linear-to-parameter domain mapping and gain parameter re-quantisation can be carried out in blocks 62 and 63 as described with reference to the gain control. As a result, modified gain and LPC parameters are transmitted with other speech parameters over the transmission media.

Figure 7:
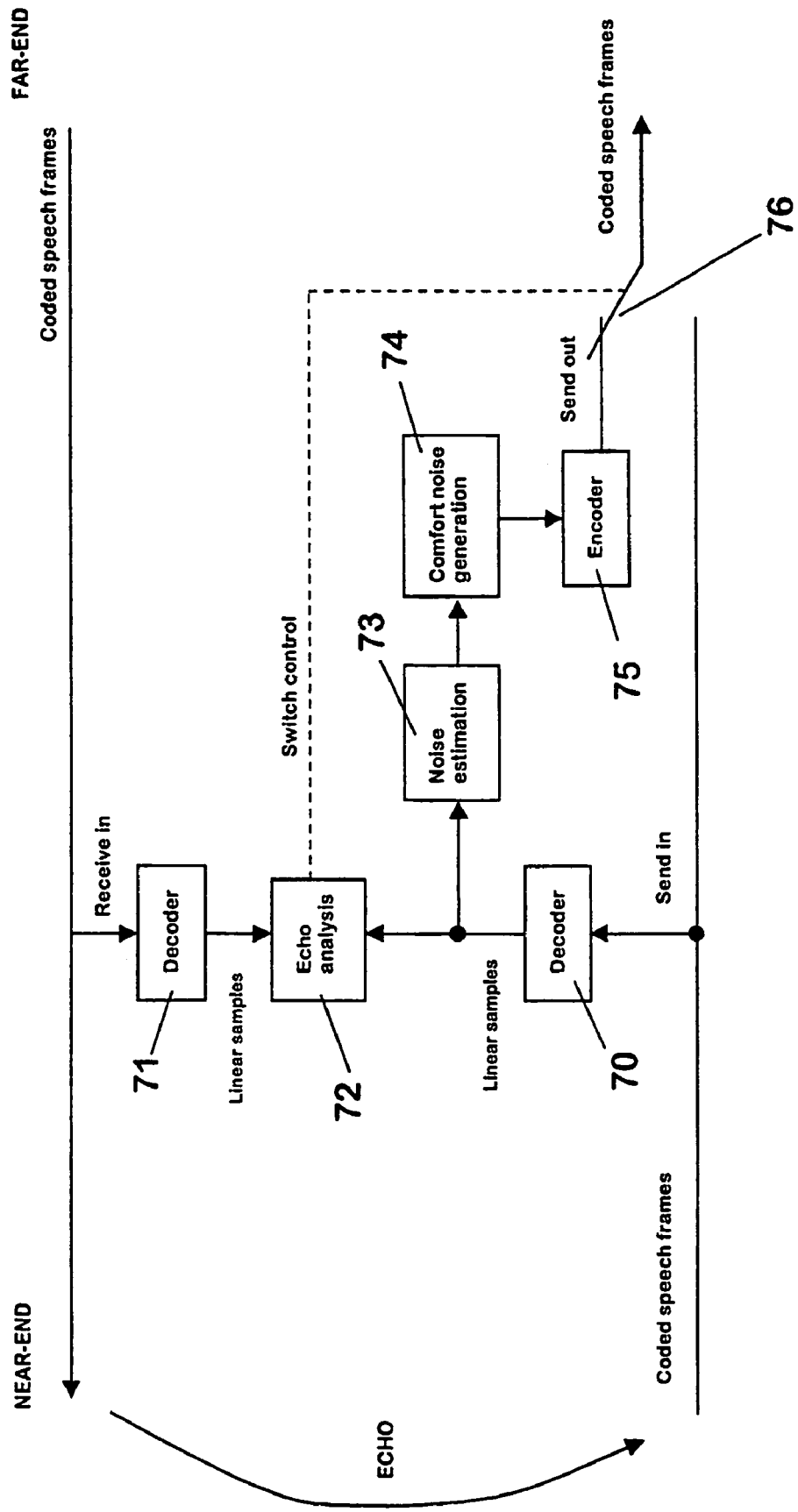
FIG. 7 shows a block diagram of an embodiment of a parameter domain echo suppression.

FIG. 7 shows a block diagram of an echo suppression device that can be integrated in a first processing device of a network element according to the invention for echo suppression in the parameter domain.

A first input line is connected to a first decoder 70 and a second input line is connected to a second decoder 71, both decoders 70, 71 being connected in turn to an echo analysis block 72. The output of the first decoder 70 is further connected via a noise estimation block 73, a comfort noise generation block 74 and an encoder 75 to one connection of a switch 76. The switch 76 can either form a connection between the encoder 75 and an output line or between the first input line and the output line. The echo analysis block 72 has a controlling access to this switch 76.

In order to be able to determine if a signal transmitted from a near end to a far end comprises an echo and to be able to suppress or cancel such an echo, signals from both transmission directions have to be analysed. Therefore, two decoders 70, 71 are employed for linearising signals from the near-end (point where echo is reflected back) as "send in" signals and from the far-end as "receive in" signals respectively. It is easier and more accurate to carry out echo analysis in the linear domain. In the echo analysis block 72, the signal levels of the two linearised signals are estimated. If the level ratio of near and far-end signals is lower than a threshold value, the near-end signal is considered as an echo and comfort noise is inserted to the signal that is to be transmitted to the far-end as "send out" signal. If there is an acoustic echo, a special filtering can be used for far-end signal estimation to improve the double talk performance of the echo suppression, as described e.g. in document WO 9749196. In order to get the correct result from the signal comparison, the echo path delay has to be known. If the delay is variable, a delay estimation might be needed to define the correct delay value. A cross-correlation can be used for the delay estimation.

In the noise estimation block 73, an accurate noise estimate of the linearised near-end signal received from the first decoder 70 is formed. Preferably, background noise is estimated in both, the level and the spectral domain. The estimation method can be the same as the method described for noise suppression. Equally, other methods can be used, e.g. methods based on filter banks or Fourier transformation.

The comfort noise is then generated in the comfort noise generation block 74 by making use of the noise estimates received from the noise estimation block 73. To generate the comfort noise, a level scaled white noise is fed through a synthesis filter which actually has the equivalent envelope spectrum as in the noise estimation block 73. Therefore the synthesis filter can be a LP filter or filter bank.

Finally, the generated comfort noise is encoded by the encoder 75 to form a frame or a sub-frame including an encoded comfort noise parameter.

If an echo was manifested by the echo analysis block 72 for the current send in frame or sub-frame, the switch 76 is switched by the echo analysis block 72 to connect the encoder 75 with the output line and the current frame or sub-frame is replaced with generated encoded comfort noise parameter. If no echo is manifested, the switch 76 keeps connecting or is switched by the echo analysis block 72 to connect the first input line with the output line so that the original frame or sub-frame is forwarded to the output line without being replaced.

By using the described method, tandem speech coding can be avoided both in speech and comfort noise frames and high quality speech can be provided.

Alternatively and in order to save processing and memory resources, the speech encoder can be omitted by generating comfort noise directly in the parameter domain. In the parameter domain comfort noise generation, a long-term LP spectrum envelope of background noise is averaged as described with reference to FIG. 6. Additionally, a long-term excitation gain parameter is averaged with the same updating principles as for the LP spectrum envelope updating, i.e. it is updated if the VAD flag is false. Typically only the fixed codebook gain value needs to be averaged as the adaptive codebook gain value is close to zero if there is noise type of signal. As a comfort noise frame or sub-frame needs to be transmitted to the far-end, original LPC and excitation gain parameters are replaced with the averaged LPC and gain parameters. Moreover, the original excitation pulses within the frame are replaced with random pulses which represent white noise in the parameter domain. If discontinuous transmission (DTX) is used in the send in direction, excitation pulses need not to be transmitted. Instead, only averaged LPC and gain parameters are transmitted in the silence description frame (SID) which is standardised for most of the speech codecs. In discontinuous transmission, random excitation pulses are generated at the decoder end.

Figure 8:
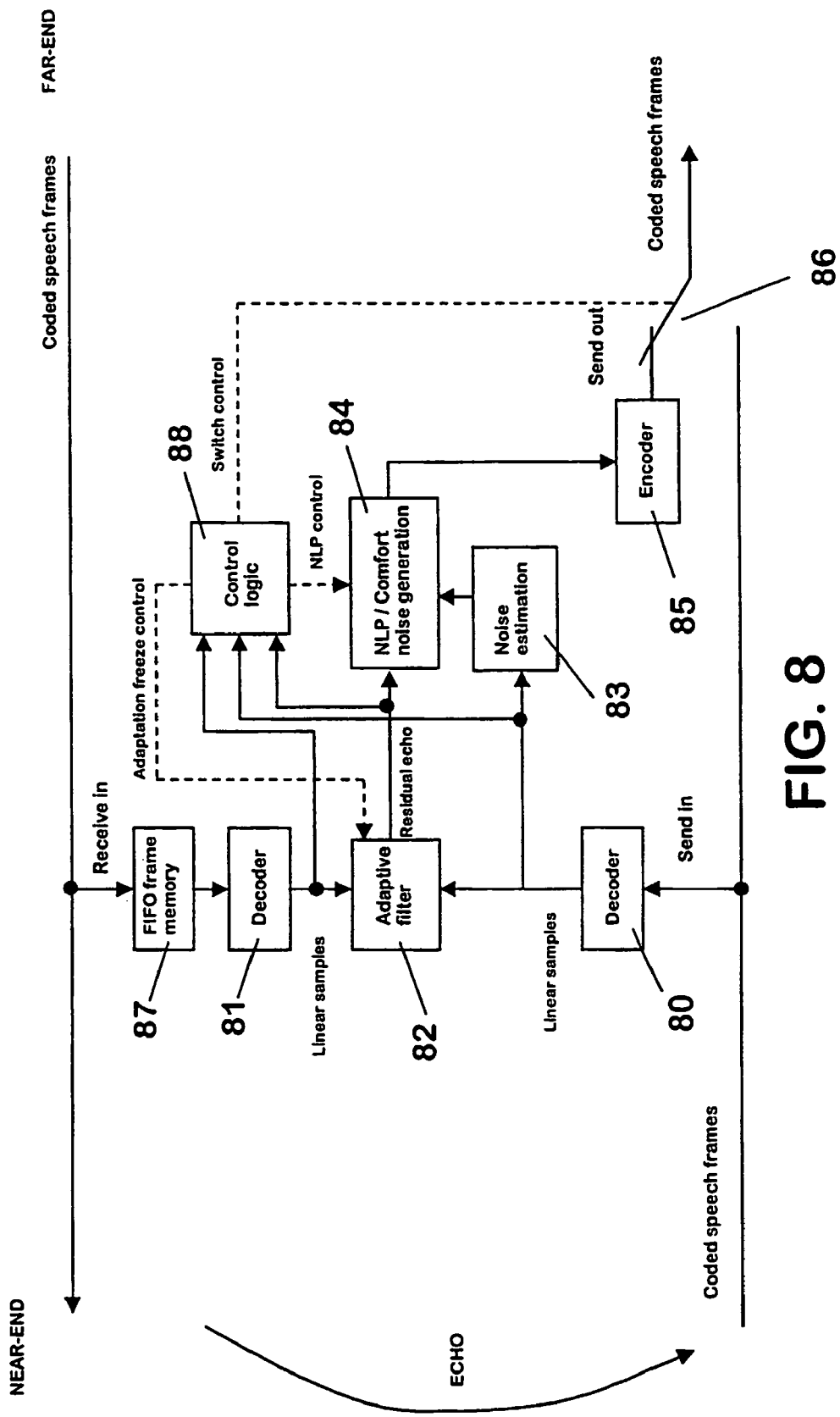
FIG. 8 shows a block diagram of an embodiment of a parameter domain echo cancellation.

FIG. 8 shows a block diagram of an echo cancellation device that can be integrated in first processing means of a network element according to the invention for echo cancellation in the parameter domain.

A first input line is connected directly to a first decoder 80 and a second input line is connected via a FIFO (first in first out) frame memory 87 to a second decoder 81, both decoders 80, 81 being connected in turn to an adaptive filter 82. The adaptive filter 82 is connected to an NLP and comfort noise generation block 84 and the first decoder is connected to a second input of the same block 84 via a noise estimation block 83. The output of the NLP and comfort noise generation block 84 is connected via an encoder 85 to a switch 86. The switch 86 can either form a connection between the encoder 85 and an output line or between the first input line and the output line. An output of the first decoder 80, the second decoder 81 and the adaptive filter 82 are connected in addition to inputs of a control logic 88. The control logic 88 has controlling access to the adaptive filter 82, the NLP and comfort noise generation block 84 and the switch 86.

The proposed echo cancellation is quite a similar to the above described echo suppression. The adaptive filter 82 and the control logic 88 are included to lower the echo signal before a residual echo suppression function is applied by a non-linear processor (NLP) 84. For the linear adaptive filtering, signals from both directions have to be linearised by the local decoders 80, 81. As there are two speech codings for the returning echo signal, cumulated non-linear distortions reduce remarkably the effectiveness of linear adaptive filtering. Therefore it might be desirable to include a non-linear echo modelling within echo cancellation, as described e.g. in document WO 9960720. Moreover, delays introduced into the echo path by speech codings, transmission or other signal processing can be compensated by the FIFO frame memory block 87. Thus the amount of taps of the adaptive filter 82 can be reduced and less processing capacity is required.

The function of the noise estimation block 83 and the NLP and comfort noise generation block 84 can be similar to the above described noise suppression, although the control of the NLP 84 can be different as more parameters, e.g. echo path model, achieved echo attenuation, send in, receive in and residual echo signals, can be utilised in the NLP decision. This is handled within control logic block 88. The output of the NLP and comfort noise generation block 84 is encoded by the encoder 85.

The switch 86 is provided for switching between speech frames received at the send in port and the encoded output of NLP/comfort noise block, i.e. the output of the send out port is either a bypassed send in frame (or sub-frame) or an echo cancelled frame (or sub-frame). A criterion of the selection could be as follows.

If there is no speech activity or if the signal level of the far-end is low enough, send in frames are bypassed. Otherwise the output of the NLP/comfort noise block 84 is chosen as output after encoding by the encoder 85. Therefore, a TFO stream is left untouched if only the near-end talks or if there is silence in both directions. If the far-end talks only, encoded comfort noise is inserted. If there is a double talk condition, either comfort noise or output of the adaptive filter 82 is chosen for the send out signal. This depends on the state of NLP 84 and typically varies during the double talk. A benefit of this method is that there is a tandem free operation for the near-end signal most of the time. At the time instants when tandem coded frames are sent to the far-end direction, double talk with the NLP block 84 is inactive. However, this is not subjectively more annoying compared to that of conventional echo cancellation as the NLP switching already introduces some artefacts on near-end speech and because direct acoustic masking and side-tone of the far-end diminish the audibility of NLP artefacts during double talk.

Alternatively, in order to save processing and memory resources, the encoder could be omitted by generating comfort noise directly in the parameter domain as described with reference to FIG. 7.

The invention claimed is:

1. An apparatus, comprising:
   a payload extraction block configured to extract coded digitised analogue signals from a digital network, wherein the extracted coded digitised analogue signals comprise at least in part parameterised coded digitised analogue signals;
   a first processor configured to process the extracted parameterised coded digitised analogue signals in a parameter domain with functions suitable to enhance a quality of the extracted parameterised coded digitised analogue signals;
   a second processor configured to process at least part of the extracted coded digitised analogue signals in a linear domain with functions suitable to enhance a quality of the extracted coded digitised analogue signals;
   a payload insertion block configured to insert the processed coded digitised analogue signals into the digital network; and
   an analyzer configured to determine a quality improvement of the digitised analogue signals resulting from a processing of the extracted parameterised coded digitised analogue signals in the parameter domain and from a processing of the extracted coded digitised analogue signals in the linear domain, and to determine which processing is capable of providing a better quality improvement,
   wherein the payload insertion block is further configured to insert at least the coded digitised analogue signals processed by the first processor or the second processor which lead to the quality improvement back into the digital network.

2. The apparatus according to claim 1, wherein the functions for processing the parameterised coded digitised analogue signals by the first processor comprise at least one of echo cancellation, noise reduction, or level control.

3. The apparatus according to claim 1, wherein the functions for processing coded digitised analogue signals by the second processor comprise at least one of echo cancellation, noise reduction, level control, transcoding or speech mixing.

4. The apparatus according to claim 1, wherein the analyzer is further configured to analyze the extracted digitised analogue signals before and after processing by the first and the second processors to determine the better quality improvement.

5. The apparatus according to claim 1, wherein the analyzer comprises a neural network.

6. The apparatus according to claim 1, further comprising:
   a bad frame handler configured to detect in the extracted coded digitised analogue signals at least one of missing frames or frames in disorder, and further configured to regenerate at least one of missing frames or reordering frames in disorder in the extracted coded digitised analogue signals.

7. The apparatus according to claim 1, wherein the analyzer is further configured to determine whether any processing is to be applied to the extracted parameterised coded digitised analogue signals and further configured to select the functions to be applied to the extracted coded digitised analogue signals by at least one of the first processor or the second processor based on at least one of the extracted coded digitised analogue signals or an external control signal.

8. The apparatus according to claim 1, further comprising:
   a control block configured to receive an external control signal and further configured to control the selection of the processing applied to the extracted coded digitised analogue signals directly or by the analyzer.

9. The apparatus according to claim 1, wherein the payload extraction block is further configured to extract parameterised coded digitised analogue signals from an internet protocol stack of a packet-based network, and further configured to insert the extracted parameterised coded digitised analogue signals into the internet protocol stack of said packet-based network.

10. The apparatus according to claim 9, further comprising:
    a decoder configured to decode said extracted parameterised coded digitised analogue signals and further configured to forward the decoded signals to the second processor;
    an encoder configured to encode the processed coded digitised analogue signals output by the second processor;
    a first selector configured to receive the extracted coded digitised analogue signals from the payload extraction block and further configured to forward the extracted coded digitised analogue signals either to the first processor or to the second processor via the decoder; and
    a second selector configured to select as inputs the outputs of the first processor and the outputs of the second processor and further configured to select which output is to be forwarded to the payload insertion block,
    wherein the analyzer is further configured to determine whether the extracted coded digitised analogue signals are to be processed by the first processor or the second processor and further configured to control the first selector and the second selector accordingly.

11. The apparatus according to claim 1, wherein the payload extraction block is further configured to extract a tandem free operation stream and a pulse code modulation stream from a time division multiplex based network, further configured to separate said tandem free operation stream from said pulse code modulation stream, further configured to provide the tandem free operation stream as parameterised coded digitised analogue signals, further configured to combine a tandem free operation stream with a pulse code modulation stream, and further configured to insert the combined stream, or only a pulse code modulation stream if no tandem free operation stream is provided to the payload insertion block, to the time division multiplex based network.

12. The apparatus according to claim 11, further comprising:
    a decoder configured to decode said tandem free operation stream and further configured to forward the decoded parameterised digitized analogue signals to the second processor;
    an encoder configured to encode the processed digitized analogue signals output by the second processor;
    a receiver configured to receive the tandem free operation stream from the payload extraction block and further configured to forward the tandem free operation stream to the first processor and to the second processor via the decoder; and
    a selector configured to receive as inputs the outputs of the first processor and the outputs of the encoder and further configured to forward an output with the quality improvement of the coded digitised analogue signals to the payload insertion block, wherein the analyzer is further configured to determine whether a processing in the first processor or in the second processor results in a better quality improvement of the digitised analogue signals and further configured to control the selector accordingly, and wherein the selector is further configured to form a pulse code modulation stream out of an output of the second processor and further configured to forward said pulse code modulation stream to the payload insertion block.

13. The apparatus according to claim 12, wherein the payload extraction block is further configured to provide the pulse code modulation stream as non-parameterised coded digitised analogue signals, and wherein the selector is further configured to forward the extracted pulse code modulation stream to the second processor and further configured to forward the output of the second processor to the payload insertion block, if no tandem free operation stream is available for processing.

14. The apparatus according to claim 11, wherein the payload extraction block is further configured to provide the pulse code modulation stream as non-parameterised coded digitised analogue signals, wherein the first processor is configured to process the tandem free operation stream in the parameter domain, wherein the second processor is configured to process the pulse code modulation stream in the linear domain, and wherein at least the processed pulse code modulation stream is forwarded to the payload insertion block.

15. The apparatus according to claim 1, wherein the first processor is further configured to compare gain parameters of the extracted parameterised coded digitised analogue signals with a desired gain, further configured to form corresponding new gain parameters, and further configured to replace original gain parameters with the new gain parameters in the extracted parameterised coded digitised analogue signals.

16. The apparatus according to claim 15, wherein the first processor comprises:
    a decoder configured to linearise the extracted parameterised coded digitised analogue signals and further configured to provide decoded gain parameters of the digitised analogue signals;
    an estimator configured to estimate a level of the linearised coded digitised analogue signal and further configured to determine desired gain values based on the estimated level of the digitised analogue signal and a desired target level of the digitised analogue signal; and
    a processor configured to determine from the decoded gain parameters of the coded digitised analogue signal and the desired gain values new gain parameters suitable for achieving the desired gain by linear-to-parameter domain mapping,
    wherein the processor is further configured to re-quantise the new gain parameters and further configured to replace the original gain parameters with the new gain parameters in the parameterised coded digitised analogue signals.

17. The apparatus according to claim 16, wherein the estimator comprises a voice activity detector configured to ensure that only speech signals are estimated in the signal level estimate.

18. The apparatus according to claim 1, wherein the first processor is further configured to attenuate noise portions and low level signal portions of the extracted parameterised coded digitised analogue signals in the time domain and further configured to correspondingly replace the gain parameters in the extracted parameterised coded digitised analogue signals.

19. The apparatus according to claim 1, wherein the first processor is further configured to attenuate frequency portions of noise in the extracted parameterised coded digitised analogue signals which have approximately the same energy as a noise estimate and further configured to correspondingly replace linear prediction parameters in the extracted parameterised coded digitised analogue signals.

20. The apparatus according to claim 19, wherein the first processor comprises:
    a decoder configured to decode linear prediction coefficients from the extracted coded digitised analogue signals;
    an estimator configured to estimate a long-term power spectrum of the noise of the digitised analogue signals and further configured to estimate a short-term power spectrum of the noise of the digitised analogue signals; and
    a processor configured to determine a desired spectrum depending on the difference between a long-term spectrum and the short-term spectrum, further configured to determine new linear prediction coefficients according to the desired spectrum, further configured to quantise the new linear prediction coefficient parameters or to convert them to line spectral pairs parameters, and further configured to replace them for the old parameters in the extracted parameterised coded digitised analogue signal.

21. The apparatus according to claim 1, wherein the payload extraction block is further configured to extract further coded digitised analogue signals from the digital network transmitted in an opposite direction to the extracted coded digitised analogue signals, wherein the further coded digitised analogue signals comprise at least in part parameterised coded digitised analogue signals; and wherein the first processor is further configured to compare first extracted parameterised coded digitised analogue signals and the further extracted parameterised coded digitised analogue signals to detect echoes in the first extracted parameterised coded digitised analogue signals and further configured to replace portions of the first extracted parameterised coded digitised analogue signals with comfort noise portions, if an echo was determined in the portion of the first extracted parameterised coded digitised analogue signals.

22. The apparatus according to claim 21, wherein the first processor comprises:
    a first decoder configured to linearise the extracted coded digitised analogue signals from a first direction;
    a second decoder configured to linearise the further extracted coded digitised analogue signals from an opposite direction;
    an echo analzyer configured to detect an echo in a portion of the first extracted parameterised coded digitised analogue signals from a first direction; and
    a generator configured to generate comfort noise and further configured to replace an original portion of the first extracted parameterised coded digitised analogue signals from the first direction with corresponding comfort noise parameters in case an echo was detected.

23. The apparatus according to claim 1, wherein the payload extraction block is further configured to extract further coded digitised analogue signals from the digital network transmitted in the opposite direction to the extracted coded digitised analogue signals, wherein the further coded digitised analogue signals comprise at least in part parameterised coded digitised analogue signals; and wherein the first processor is further configured to attenuate an echo signal in the first extracted parameterised coded digitised analogue signals making use of the further parameterised coded digitised analogue signals and further configured to suppress a residual echo signal.

24. The apparatus according to claim 23, wherein the first processor comprises:
   a first decoder configured to linearise the extracted coded digitised analogue signals from a first direction;
   a second decoder configured to linearise the further extracted coded digitised analogue signals from an opposite direction;
   an adaptive filter and a control logic receiver configured to linearise signals from the first and the second decoder to attenuate echo signals in the linearised coded digitised analogue signals received from the first decoder;
   a non linear processor configured to process residual echo suppression based on residual echo signals received from the adaptive filter and further based on a noise estimation of the linearised coded digitised analogue signals from the first direction; and
   a generator configured to generate comfort noise based on the residual echo suppression and further configured to replace an original portion of a first extracted parameterised coded digitised analogue signal with a corresponding comfort noise parameter in case an echo was detected.

25. The apparatus according to claim 21, wherein the first processor is further configured to by-pass the first extracted parameterised coded digitised analogue signals without processing, if there is no signal activity in the opposite direction or if the signal level of the extracted parameterised coded digitised analogue signals is below a threshold level in the opposite direction.

26. The apparatus according to claim 1, wherein the extracted coded digitised analogue signals comprise at least one of coded speech or coded video.

27. The apparatus according to claim 1, wherein the apparatus comprises a network element configured to enhance the quality of the extracted coded digitised analogue signals transmitted at least in parameterised coded form via the digital network to which the network element has access.

28. A method, comprising:
   extracting coded digitised analogue signals from a digital network, wherein the coded digitised analogue signals comprise parameterised coded digitised analogue signals;
   determining a quality improvement of the coded digitised analogue signals to be expected by a processing of the extracted coded digitised analogue signals in a parameter domain and by a processing of the extracted coded digitised analogue signals in a linear domain;
   processing the extracted parameterised coded digitised analogue signals in the parameter domain if a greater quality improvement is expected by the processing in the parameter domain with functions suitable for enhancing the quality of digitised analogue signals;
   processing the extracted parameterised coded digitised analogue signals in the linear domain if a greater quality improvement is expected by processing in the linear domain; with functions suitable for enhancing the quality of digitised analogue signals; and
   inserting the processed parameterised coded digitised analogue signals into the digital network that were processed in the parameter domain or the linear domain.

29. The method according to claim 28, further comprising:
   decoding the extracted parameterised coded digitised analogue signals for processing in the linear domain; and
   encoding the extracted parameterised coded digitised analogue signals after processing in the linear domain to form parameterised coded digitised analogue signals again.

30. The method according to claim 29, further comprising:
   transforming the decoded extracted parameterised coded digitised analogue signals to form non-parameterised coded digitised analogue signals; and
   inserting the non-parameterised coded digitised analogue signals into the digital network.

31. The method according to claim 28, further comprising:
   forming non-parameterised coded digitised analogue signals corresponding to the extracted parameterised coded digitised analogue signals; and
   processing the non-parameterised coded digitised analogue signals in the linear domain,
   wherein processing the extracted parameterised coded digitised analogue signals comprises processing in the parameter domain if a greater quality improvement is expected by processing in the parameter domain,
   wherein inserting comprises inserting the processed extracted non-parameterised coded digitised analogue signals into the digital network again, and
   wherein inserting further comprises inserting the processed extracted parameterised coded digitised analogue signals into the digital network again if a greater quality improvement is expected by processing in the parameter domain.

32. The method according to claim 28, wherein the quality improvement of a processing in the linear and in the parameter domain is determined by analysing the extracted parameterised coded digitised analogue signal before and after processing in the linear and in the parameter domain.

33. The method according to claim 28, wherein the quality improvement of the processing in the linear domain and the processing in the parameter domain is determined using a neural network.

34. The method according to claim 28, further comprising:
   selecting processing functions that are suitable for an enhancement of the quality of the extracted parameterised coded digitised analogue signals; and
   performing only those processing functions.

35. The method according to claim 28, wherein the processing in the parameter domain comprises forming corresponding gain parameters for a gain control by comparing gain parameters of the extracted parameterised coded digitised analogue signals with a desired gain, and replacing the gain parameters with the corresponding gain parameters in the extracted parameterised coded digitised analogue signals.

36. The method according to claim 35, further comprising:
   linearising extracted parameterised coded digitised analogue signals;
   providing decoded gain parameters of the digitised analogue signals;
   estimating a signal level of the linearised coded digitised analogue signals;
   determining desired gain values based on the estimated signal level and a desired target signal level;
   determining out of the decoded gain parameters of the coded digitised analogue signals and the desired gain values, new gain parameters suitable for achieving a desired gain by linear-to-parameter domain mapping; and
   re-quantising the new gain parameters and replacing original gain parameters with the new gain parameters in the coded digitised analogue signals.

37. The method according to claim 28, wherein the processing in the parameter domain comprises attenuating noise portions and low level signal portions of the extracted parameterised coded digitised analogue signals for noise suppression in the time domain, and for correspondingly replacing gain parameters in the extracted parameterised coded digitised analogue signals.

38. The method according to claim 28, wherein the processing in the parameter domain comprises attenuating frequency portions of noise for noise suppression in the extracted parameterised coded digitised analogue signals which have which have approximately the same energy as a noise estimate and for correspondingly replacing linear prediction parameters in the extracted parameterised coded digitised analogue signals.

39. The method according to claim 38, further comprising:
decoding linear prediction coefficients from extracted coded digitised analogue signals;
estimating a long-term power spectrum of the noise of the digitised analogue signals;
estimating a short-term power spectrum of the noise of the digitised analogue signals;
determining a desired spectrum based upon a difference between the long-term spectrum and the short-term spectrum;
determining new linear prediction coefficients according to the desired spectrum; and
quantising the new linear prediction coefficients parameters or converting them to line spectral pairs parameters and replacing them for the old parameters in the parameterised coded digitised analogue signal.

40. The method according to claim 28, wherein the processing in the parameter domain comprises extracting further parameterised coded digitised analogue signals transmitted in the opposite direction for echo suppression, comparing the first extracted and the further extracted parameterised coded digitised analogue signals to detect echoes in the first extracted parameterised coded digitised analogue signals, and replacing portions of the first extracted parameterised coded digitised analogue signal with generated portions of comfort noise parameters, if an echo was determined in a portion of a first extracted parameterised coded digitised analogue signal.

41. The method according to claim 40, further comprising:
linearising the extracted coded digitised analogue signals transmitted from a first direction and an opposite direction before comparing them.

42. The method according to claim 28, further comprising:
extracting further coded digitised analogue signals from the digital network transmitted in the opposite direction to the extracted coded digitised analogue signals, wherein the further coded digitised analogue signals comprise at least in part parameterised coded digitised analogue signals,
attenuating an echo signal in first extracted parameterised coded digitised analogue signals making use of further parameterised coded digitised analogue signals, and
suppressing the residual echo signal.

43. The method according to claim 42, further comprising:
linearising the extracted coded digitised analogue signals transmitted in a first direction and the opposite direction before attenuating the echo signal,
generating comfort noise based on the result of the suppression and an estimated noise in a first extracted digitised analogue signal and
replacing a portion of an original first extracted digitised analogue signal in which an echo was detected with a portion comprising a corresponding comfort noise parameter.

44. The method according to claim 40, wherein the processing in the parameter domain comprises by-passing the first extracted parameterised coded digitised analogue signals without echo detection, if there is no signal activity in the opposite direction or if the signal level of the extracted parameterised coded digitised analogue signals is below a threshold level in the opposite direction.

45. A computer readable storage medium encoded with instructions that, when executed by a computer, perform a process, the process comprising:
extracting coded digitised analogue signals from a digital network, wherein the coded digitised analogue signals comprise parameterised coded digitised analogue signals;
determining a quality improvement of the coded digitised analogue signals to be expected by a processing of the extracted coded digitised analogue signals in a parameter domain and by a processing of the extracted coded digitised analogue signals in a linear domain;
processing the extracted parameterised coded digitised analogue signals in the parameter domain if a greater quality improvement is expected by the processing in the parameter domain with functions suitable for enhancing the quality of digitised analogue signals;
processing the extracted parameterised coded digitised analogue signals in the linear domain if a greater quality improvement is expected by processing in the linear domain with functions suitable for enhancing the quality of digitised analogue signals; and
inserting the processed parameterised coded digitised analogue signals into the digital network that were processed in the parameter domain or the linear domain.

* * * * *